Patented July 14, 1936

2,047,354

UNITED STATES PATENT OFFICE 2,047,354

PROCESS OF PRODUCING FINELY DIVIDED MATERIAL

Harold Simmons Booth, Cleveland Heights, Ohio

No Drawing. Application July 22, 1932, Serial No. 624,055

5 Claims. (Cl. 23—1)

This invention relates to a new method for manufacturing substances in a finely divided form. It is particularly well adapted to pigments, insecticides, and similar materials where the state of subdivision is an important factor.

Fundamentally, my invention is based on the concept of contacting—that is, either suspending or dissolving, preferably the latter—the substance to be formed into a state of fine division, in an inert fused substance, such as an inorganic compound or mixture of compounds, followed by contacting the mixture with a liquid in which the inert fused substance is substantially soluble while the substance desired in a fine state is not significantly soluble, under such conditions that the normal processes of particle size growth are impeded by the presence on the surface of the particle of a substance preventing crystal growth. Such substance may be present in the original fused mass, it may be formed in situ, or it may be present in the liquid medium, as outlined below.

A successful procedure, one which does not depend on colloidal action, but purely on crystal phenomena, resides in having present in the quenching or leaching liquid a substance which will react chemically with the surface (and, by virtue of being limited in quantity, the surface only) of the particles of the pigment or similar material, to form an insoluble compound chemically different from the pigment, and not isomorphous with it; this effectively prevents crystal growth by interposing a barrier of foreign crystal forms. For example, when a material like $CaSO_4$ or $CaCO_3$ dissolved in a fused bath like sodium chloride, and the whole mass quenched into water containing limited quantities of a compound which will react with the $CaSO_4$ or $CaCO_3$, particle size growth is effectively impeded. Such material are $H_3PO_4$, $H_2SiF_6$ (or $SiF_4$ passing into the solution during the operation), HF, etc. For calcium carbonate, $NaHSO_4$ or $H_2SO_4$ are equally applicable when used in limited quantities. For calcium sulfate, a soluble alkali carbonate will effect surface alteration, and thereby inhibit particle size growth. Similarly, a fusion in which NaF is dissolved can be quenched into water containing small amounts of $CaCl_2$, or any other water-soluble salt forming an insoluble fluoride—e. g., $MaCl_2$, $Th(NO_3)_4$, etc., and the same effect readily realized. Even the small amounts of calcium and other alkaline salts normally present in natural waters are sufficient to have considerable effect in forming an insoluble coating of $CaF_2$ and thereby maintaining fine division.

No different in fundamental theory is the procedure of adding a third substance to the fused mass which will react with a substance dissolved in the quenching or leaching medium to form an insoluble crystal form. If, to return to the example of a $ZnCl_2$ addition to a $CaSO_4$ solution in liquid KCl, we quench such a fused mass into water containing a soluble sulfide, it is readily evident that the zinc sulfide which forms will significantly interfere with normal crystallization processes. Of course, the situation can also be reversed, with the negative material (like the sulfide here) present in the fusion and the positive ion in the liquid medium.

It will readily be seen that one general characteristic of my invention is that the pigment or similar material under treatment does not undergo significant chemical change. In this respect, my process is sharply different from all others, since other known processes for fine division of pigments and insecticides require the chemical formation of such materials under conditions which will give fine particle size. For example, if it is desired at present to make fine whiting ($CaCO_3$), it is necessary to carbonate milk of lime under proper dispersing conditions. This makes it impossible to utilize already existing calcium carbonate for pigment or allied purposes. The same holds true of the vast amount of by-product calcium sulfate. In the case of sodium fluoride, there are large amounts of this material in heavy, dense form as recovered from chemical operations by evaporation, but this cannot be utilized for general insecticide purposes because lacking in fineness of dispersion. By my process, such sodium fluoride can readily be converted to the desired degree of fine dispersion.

A suspension of magnesium oxide in salt can readily be obtained from natural ores, and finely divided metal oxides and similar materials can also be formed as suspensions in fused compounds. It is manifest that the treatments above described for soluble substances are equally applicable to such materials, even though they are only suspended, and not dissolved, in the fusion, and it is to be understood that the term "solution" as herein used to describe the material to be obtained in finely divided form includes such suspensions within its scope.

Having thus described my invention, what I claim is:

1. The process of obtaining a crystalloid material in a state of fine subdivision which comprises contacting a solution of a water insoluble crystalloid in a fused inorganic water soluble compound inert thereto with an aqueous precipitating agent in which is dissolved a compound which will react with the surface of particles of said crystalloid to form a non-isomorphous crystalline solid insoluble in the reaction mixture, the molecular proportion of said compound being small relative to that of the crystalloid.

2. The process of producing crystalline material in a state of fine subdivision which comprises precipitating a crystalloid from a solution of the same in a fused, inert, inorganic solvent, in a solution not a solvent for said crystalloid, in the presence of a dissolved non-isomorphous crystalloid capable of reacting with the first crystalloid to form an insoluble surface film.

3. The process of producing crystalline material in a state of fine subdivision which comprises precipitating a water insoluble crystalloid from a solution thereof in a fused, inert, water soluble solvent by the addition thereto of a dilute aqueous solution of a compound capable of forming on the nascent crystals an insoluble surface film of a crystalline material non-isomorphous therewith.

4. The process of producing crystalline material in a fine state of subdivision which consists in dissolving a crystalloid in a fused solvent which is solid at room temperature and then discharging the melt into a liquid, which is a solvent for said fused solvent and which contains in solution a compound capable of forming on the surface of the nascent crystals of said crystalloid an insoluble non-isomorphous crystalline compound.

5. The process of producing a crystalline compound of the group consisting of alkaline earth sulphates, carbonates and mixtures thereof, in a fine state of subdivision which comprises dissolving the same in a fused, inert, inorganic material and then contacting the resulting fusion with water and one or more ions, other than its constituent negative ion, of the group consisting of $PO_4'''$, $F'$, $SO_4''$ and $SiF_6''$.

HAROLD SIMMONS BOOTH.